F. P. SHOEMAKER.
LIQUID FUEL HEATING APPARATUS.
APPLICATION FILED JUNE 16, 1911.
1,073,534.
Patented Sept. 16, 1913.
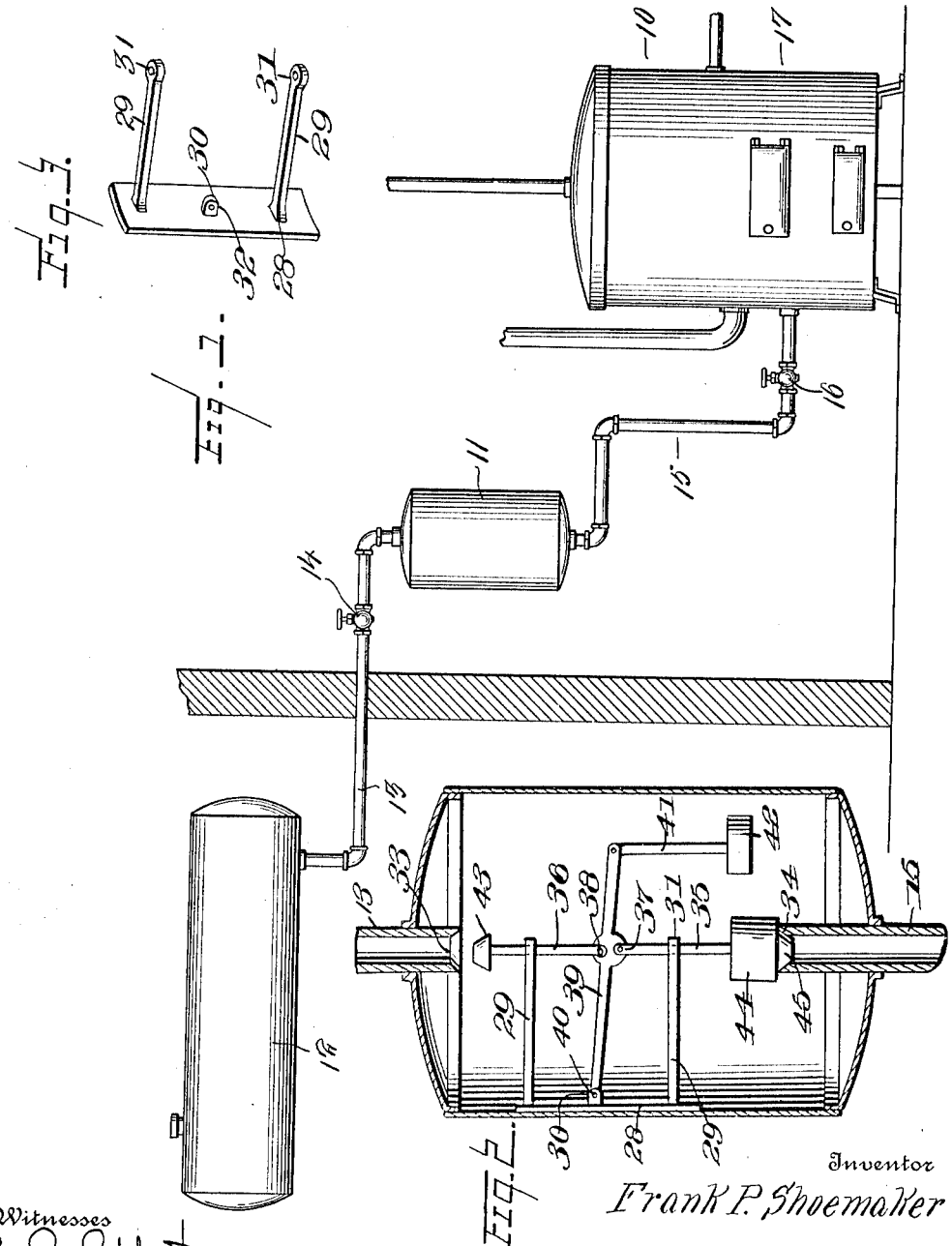
Inventor
Frank P. Shoemaker
By Victor J. Evans
Attorney
Witnesses

UNITED STATES PATENT OFFICE.

FRANK P. SHOEMAKER, OF BASIC CITY, VIRGINIA.

LIQUID-FUEL HEATING APPARATUS.

1,073,534.

Specification of Letters Patent.

Patented Sept. 16, 1913.

Application filed June 16, 1911. Serial No. 633,476.

*To all whom it may concern:*

Be it known that I, FRANK P. SHOEMAKER, a citizen of the United States, residing at Basic City, in the county of Augusta and State of Virginia, have invented new and useful Improvements in Liquid-Fuel Heating Apparatus, of which the following is a specification.

My invention embodies an apparatus in which the supply of fuel to the burner is automatically controlled by the amount of liquid fuel in the auxiliary tank.

Reference is to be had to the accompanying drawings constituting a part of this specification, in which similar characters of reference denote corresponding parts in all the views, and in which—

Figure 1 is a side elevation showing a heater, an auxiliary tank and a main tank, the heater and auxiliary tank being disposed within a building and the main tank being disposed exterior of the building. Fig. 2 is a vertical sectional view of the auxiliary tank, showing the automatic controlling mechanism. Fig. 3 is a perspective view of the bracket upon which the automatic controlling mechanism is mounted.

Referring more particularly to the views, I provide a heater 10, an auxiliary tank 11 and a main tank 12, the main tank 12 being connected to the auxiliary tank 11 by a pipe 13 having a controlling valve 14 mounted thereon and the auxiliary tank 11 being connected to the heater 10 by a pipe 15 having a controlling valve 16 mounted thereon, the heater 10 being positioned below the auxiliary tank 11 and the auxiliary tank 11 being positioned below the main tank 12 so that liquid fuel, contained in the main tank 12 will gravitationally flow into the auxiliary tank 11 and thence into the heater 10 as will be hereinafter more fully disclosed.

Secured to the inner side of the auxiliary tank 11 is a plate 28 having laterally extending arms 29 integrally formed thereon and formed on the said plate, between the arms 29 is a lug 30 the arms 29 being provided with vertically extending apertures 31 and the lug 30 being provided with a horizontally extending aperture 32. An end of the pipe 13 terminates within the upper end of the auxiliary tank 11 and the said end of the pipe 13 is provided with a valve seat 33. In a like manner an end of the pipe 15 projects upwardly through the base of the auxiliary tank 11 and the end of the said pipe is provided with a valve seat 34, the ends of the pipes 13 and 15 being in vertical alinement. Extending through the apertures 31 of the arms 29 and slidable relatively to the arms 29 are rods 35, 36, the said rods having ends 37, 38 thereof pivotally connected to a rod 39 mounted to swing on the lug 30 by means of a pin 40 passed through an aperture 32 in the lug 30 and an aperture at one end of the rod 39. Pivotally mounted on the outer end of the rod 39 is a weighted rod 41 having a weight 42 secured to the lower end thereof and secured to the upper end of the rod 36 is a valve 43 adapted to seat on the valve seat 33 of the pipe 13. Secured to the lower end of the rod 35 is a hollow float 44 having the lower end thereof terminating in a valve 45, the said valve being adapted to seat on the valve seat 34 of the pipe 15, the rods 35 and 36 being restricted in length so that when one of the valves is seated on one of the mentioned valve seats, the other valve will be disengaged from its respective valve seat as will be hereinafter more fully set forth.

In the operation of my device, the valve 14 is opened to permit the liquid fuel to flow from the main tank 12 through the pipe 13 and into the auxiliary tank 11, the said auxiliary tank being at this time empty so that the valve 43 will be spaced from the valve seat 33 and the valve 45 will be in engagement with the valve seat 34 to close the pipe 15. Now as the liquid fuel, entering the auxiliary tank 11, reaches a height in the tank, sufficient to enable the buoyancy of the float 44 to overcome the weight of the weight 42 secured to the rod 41, the float 44 will move upwardly, thus unsealing the valve 45 and opening the pipe 15 and the upward movement of the float 44 will cause the valve 43 to engage the valve seat 33, thus cutting off the supply of liquid fuel from the main tank 12, through the pipe 13. The valve 16 being in open position, the liquid fuel in the tank 11 will flow through the pipe 15 and into the heater 10. When the depth of liquid fuel in the auxiliary tank 11 becomes low, the weight 42 will overcome the buoyancy of the float 44, thus moving the float 44 downwardly so that the valve 45 will engage the valve seat 34 to close the pipe 15 and hence the valve 43 will be disengaged from the valve seat 33 to open the pipe 13 and permit a new supply of liquid fuel to enter the auxiliary tank 11 from the main tank 12, so that the flow of liquid fuel to the burner 21 will be at all times regulated by the height of the liquid fuel in the auxiliary tank 11 and if the heater 10 is operated constantly to heat water or the like, a steady flow of liquid fuel will be received in the heater at all times.

From the foregoing description it will be seen that I not only provide a means for heating purposes, but I provide a structure by means of which the flow of liquid fuel to the burner is constant at all times, thus preventing the dangerous explosions in the heater, due to an over supply of liquid fuel thereto.

Having thus fully described the invention, what I claim as new, is:—

In a liquid fuel heating apparatus, a tank having an inlet and an outlet, a plate mounted in the said tank, arms extended laterally from the said plate, a lug integrally formed on the plate, between the said arms, a rod mounted to swing on the said lug, valve rods mounted to slidably extend through apertures in the said arms and having each one end pivotally connected to the rod mounted on the said lug, a valve secured to the upper end of one of the said valve rods and adapted to close the said inlet, a float carried by the other valve rod, a valve integrally formed on the said float and adapted to close the said outlet and a weight secured to the outer end of the rod mounted on the said lug.

In testimony whereof I affix my signature in presence of two witnesses.

FRANK P. SHOEMAKER.

Witnesses:
SAML. H. ARNALL,
J. F. WILLSON.

---

Copies of this patent may be obtained for five cents each, by addressing the "Commissioner of Patents, Washington, D. C."